United States Patent [19]
Feichtner et al.

[11] 3,746,866
[45] July 17, 1973

[54] ACOUSTO-OPTICAL SYSTEMS

[75] Inventors: John D. Feichtner, Murrysville; Milton Gottlieb, Pittsburgh; George W. Roland, Monroeville, all of Pa.

[73] Assignee: Westinghouse Electric Corporation, Pittsburgh, Pa.

[22] Filed: Dec. 20, 1971

[21] Appl. No.: 209,849

[52] U.S. Cl. .................. 250/372, 350/161
[51] Int. Cl. ................................ H01j 1/62
[58] Field of Search ............... 250/77; 350/161

[56] References Cited
UNITED STATES PATENTS

| | | | |
|---|---|---|---|
| 3,655,255 | 4/1972 | Krause | 350/161 |
| 3,373,380 | 4/1968 | Adler | 350/161 |
| 3,365,581 | 1/1968 | Tell et al. | 350/161 |
| 2,270,232 | 1/1942 | Rosenthal | 350/161 |
| 3,297,876 | 1/1967 | Maria | 350/161 |
| 3,536,506 | 10/1970 | Fraser | 350/161 |

OTHER PUBLICATIONS

J. A. Savage et al. "Chalcogenide Glasses ... A State of The Art Review," Infrared Physics, Vol. 5, pp. 195–204.

Primary Examiner—James W. Lawrence
Assistant Examiner—B. C. Anderson
Attorney—F. Shapoe et al.

[57] ABSTRACT

An acousto-optical system which diffracts or modulates light passing through a crystal of $Tl_3AsSe_3$ by means of sound waves in the crystal is disclosed. Sound waves are generated in the crystal by means of a transducer connected to an RF generator. The acousto-optical system may be in the form of a display device, a laser modulator, or other devices. An acoustic delay line using a crystal of $Tl_3AsSe_3$ is also disclosed.

27 Claims, 4 Drawing Figures

Patented July 17, 1973 3,746,866

ACOUSTO-OPTICAL SYSTEMS

BACKGROUND OF THE INVENTION

In 1932 Brillouin discovered that high frequency sound waves can cause diffraction of light. With the advent of the laser and advances in high frequency acoustic techniques many applications for this phenomenon have been found such as display devices or laser modulators.

A sound wave moving in crystal is composed of alternating compression and rarefaction fronts. The indices of refraction in these fronts is different, so that the crystal acts as a diffraction grating, diffracting light which passes through it, the angle of diffraction increasing as the frequency of the sound wave increases, and the amount of light diffracted increasing with the intensity of the sound wave.

There are two modes of diffraction, the Debye-Sears mode and the Bragg mode. The Debye-Sears mode is obtained if the width of the acoustic beam is less than about $\Lambda^2/(4\lambda)$ and the Bragg mode is obtained if the width of the acoustic beam is greater than about $\Lambda^2/(4\lambda)$ where $\Lambda$ is the acoustic wavelength and $\lambda$ is the light wavelength. In both modes the acoustic wavelength $\Lambda$ must be greater than the light wavelength $\lambda$, and $\lambda$ must be within the transparency region of the crystal. In the Debye-Sears mode light enters the crystal parallel to the acoustic wave fronts (0° diffracting angle) and is multiply-diffracted into many images or orders of the initial light beam. In the Bragg mode light enters the crystal at the Bragg angle $\phi$ to the acoustic wave fronts where $\sin \phi = \lambda/\Lambda$. In this mode the acoustic wavelength and the Bragg angle are matched to the particular light wavelength, and a single image is diffracted from the crystal at the Bragg angle $\phi$ to the acoustic wave fronts.

A good acousto-optical material should have a high figure of merit, $M_2$, a measurement of the amount of light diffracted for a given amount of acoustic power, where $M_2 = n^6 p^2/\rho v^3$ and $n$ is the refractive index, $p$ is the photoelastic coefficient, $\rho$ is the density, and $v$ is the acoustic velocity. As the formula indicates, a low velocity will give a high figure of merit and, in addition, it will give a greater delay per unit length if the crystal is used in a delay line thus permitting acoustic signal processing devices to have smaller physical dimensions. A good acousto-optical material should also have a low acoustic attenuation, allowing a high frequency wave to propagate a long distance before it is absorbed.

SUMMARY OF THE INVENTION

We have found that crystals of $Tl_3AsSe_3$ have exceptionally good acousto-optical properties and desirable physical characteristics such as resistance to moisture. Also, they can be easily grown in large sizes ($>1 cm^3$). The velocity of acoustic waves in these crystals is lower than prior art materials, they have a figure of merit higher than most prior art materials, and their acoustic attenuation is low. They are used in acousto-optical systems such as display devices and laser modulators, and are also used in acoustic delay lines as herein described.

THE CRYSTAL

Figure 1:
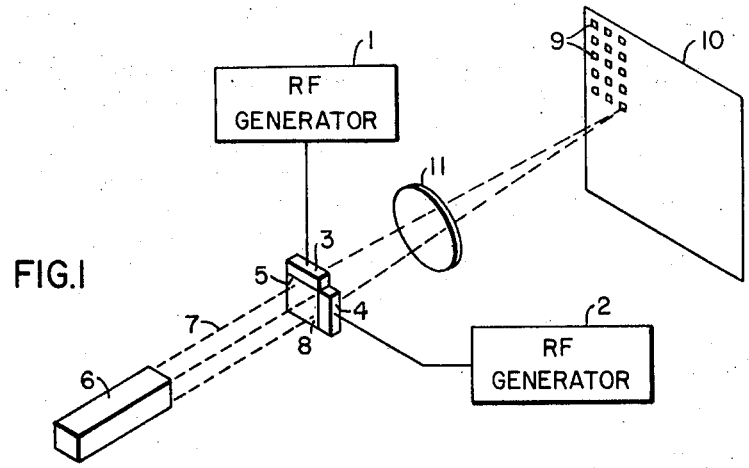
FIG. 1 is an isometric diagrammatic drawing of a display device.

A detailed description of the preparation of a crystal of $Tl_3AsSe_3$ is given in application Ser. No. 181,409 by George W. Roland and John D. Feichtner titled "Non-Linear Optical Compound, Crystal, and Devices," filed Sept. 17, 1971. Briefly, the compound $Tl_3AsSe_3$ is prepared by melting together stoichiometric quantities of the elements thallium, arsenic, and selenium, and a crystal of the compound is prepared by melting the compound and lowering it through a two-zone furnace having a steep temperature gradient at the melting point, 316° C ± 2° C.

The crystal of this invention is negative uniaxial and piezoelectric. Its Laue class is $\overline{32}/m$, and the diffraction aspect derived from X-ray data is R**. Of the two permitted space groups, R3m and R32, space group R3m is more probable based on the observed absence of optical activity. The length of the $a$ axis is about 9.90 A and the $c$ axis about 7.13 A, and the transparency region is about 1.25 to about $17 \mu m$. Its density is 7.83 gms/cc.

The acousto-optical figure of merit, $M_2$, is 995 at $\lambda = 3.39 \mu m$ (measured by a direct comparison method with fused silica at $\lambda = 0.6328 \mu m$ using the $p33$ component of the photoelastic tensor, i.e. sound wave propagated along the $c$ axis, light polarized perpendicular to the $c$ axis and propagated normal to the sound wave). From this figure of merit $p33$ was estimated to be 0.228. Generally, the Debye-Sears mode is obtained at acoustic frequencies less than about 50MHz (megahertz) and the Bragg mode at acoustic frequencies greater than about 50MHz.

The following table gives the measured refractive indices of a $Tl_3AsSe_3$ crystal where $n_0$ is the refractive index of an ordinary wave and $n_e$ is the refractive index of an extraordinary wave.

| Wavelength $\lambda(\mu m)$ | Uncertainty in $\lambda(\mu m)$ | $n_0$ | $n_e$ |
|---|---|---|---|
| 1.553 | 0.1 | 3.443 | 3.248 |
| 2.66 | 0.1 | 3.356 | 3.170 |
| 3.27 | 0.19 | 3.339 | 3.152 |
| 3.365 | 0.13 | 3.337 | 3.155 |
| 3.38 | 0.32 | 3.339 | 3.152 |
| 4.35 | 0.18 | 3.331 | 3.148 |
| 4.46 | 0.34 | 3.334 | 3.142 |
| 4.55 | 0.43 | 3.326 | 3.142 |
| 5.26 | 0.6 | 3.321 | 3.1405 |
| 5.3 | 0.2 | 3.326 | 3.142 |

The width of the crystal is not critical and several millimeters are typical; however, the optical faces of the crystal should be wider than a laser can be focused, about $10^{-3}$ cm., so that light is not wasted. The crystal should not be too thin in the direction of light propagation as this will result in poor interaction between the light and sound and therefore a low intensity defraction, and if the crystal is too thick light loss due to absorption will be high.

THE SOUND WAVES

The sound wave may be a longitudinal wave, where the particle motion is in the direction of propagation of the wave, or it may be a shear wave, where the particle motion is perpendicular to the propagation direction of the wave, or it may be a combination of both. Preferably, it is either pure shear or pure longitudinal because the two waves travel at different velocities and quickly become out of phase. For delay line applications shear waves are desirable because of their lower velocity. Pure shear waves are obtained by propagating the wave in a pure shear direction (found experimentally by orientating the crystal) using a shear wave generating transducer such as Y cut or A-C cut quartz, which is glued to the crystal. Longitudinal waves are obtained by propagating the wave along the $c$-axis or another pure longitudinal direction using a longitudinal wave generating transducer such as X-cut quartz which is glued to the crystal.

At 30MHz, the velocity of shear waves propagating parallel to the $c$-axis is $1.03 \times 10^5$ cm/sec. For propagation along one of the $a$-axes, the velocity of longitudinal waves is $1.98 \times 10^5$ cm/sec. and of shear waves is $9.9 \times 10^4$ cm/sec.

DISPLAY DEVICES

In a display device a light beam is directed at the crystal and the deflected beam which leaves the crystal is directed at some type of viewing screen.

In FIG. 1 RF generators 1 and 2 send RF signals to transducers 3 and 4 respectively which respectively generate vertically moving and horizontally moving sound waves in crystal 5, preferably in the Bragg mode so that there is only one diffracted beam. The light, which is preferably parallel and polarized for good resolution, is obtained from laser 6 which generates a coherent beam of light 7 directed at one of the two parallel optical faces 8 of crystal 5. Light passing through crystal 5 is directed at various spots 9 on viewing screen 10 by means of the vertically and horizontally moving sound waves generated by transducers 3 and 4. Lens 11 focuses the light at the spot.

The illuminated spots may each be a page of information which is then optically enlarged and projected on a second viewing screen (not shown). The illuminated spots could also in themselves form a pattern. For example, viewing screen 10 could be a infrared-sensitive phosphor coated screen such as zinc sulfide doped with lead and copper and flooded with UV light and the successive illumination of selected spots would form a picture similar to a TV picture. Or, viewing screen 10 could be infrared or thermally-quenched UV-excited phosphor screen where ultraviolet light causes the entire screen to be illuminated, but each selected spot successively struck by the beam from crystal 5 is darkened to form a picture on the screen.

LASER MODULATOR

In a laser modulator the acousto-optical system modulates a portion of the output of the lasing medium. If the light is focused to less than about $10^{-2}$ or $10^{-3}$ cm. it will be modulated but not diffracted. For greater diameter focal spots it will be both diffracted and modulated. A laser modulator could be used, for example, to send signals by means of the fluctuating laser beam intensity.

Figure 2:
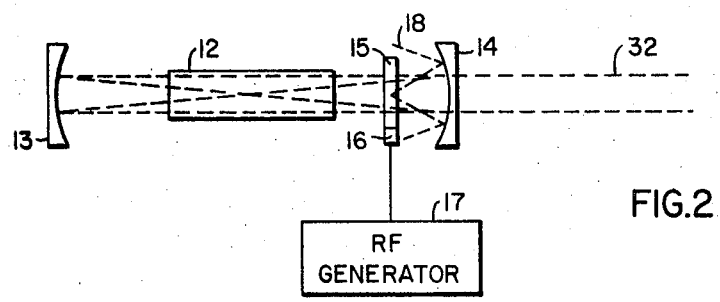
FIG. 2 is a diagrammatic drawing of a laser modulator of the internal configuration.

FIG. 2 shows a laser modulator of the internal configuration. in FIG. 2, lasing medium 12 produces a beam of coherent light which is multiply-reflected between mirrors 13 and 14. Mirror 13 totally reflects the light and mirror 14 partially reflects it and partially transmits it as the laser output 32. Interposed between lasing medium 12 and mirror 14 is a crystal 15 of $Tl_3AsSe_3$. (The crystal could also be positioned between mirror 13 and the lasing medium). To crystal 15 is affixed a transducer 16 which is electrically connected to an RF generator 17. This generator produces a radio-frequency electrical signal which transducer 16 converts into an acoustic wave which moves through crystal 15 diffracting light as shown at 18.

Figure 3:
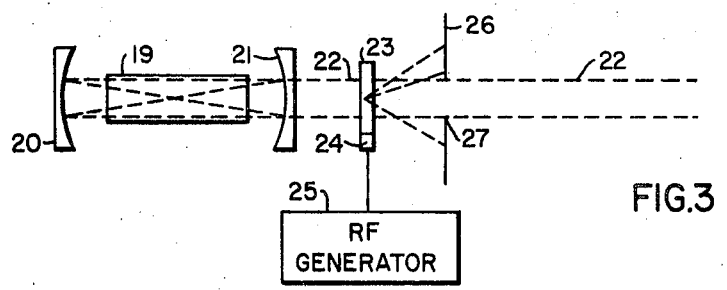
FIG. 3 is a diagrammatic drawing of a laser modulator of the external configuration.

FIG. 3 shows a laser modulator of the external configuration. In FIG. 3 lasing medium 19 produces a beam of coherent light which is multiply-reflected between mirror 20, which totally reflects the beam, and mirror 21 which partially reflects the beam and partially transmits it as laser output 22. The laser output 22 strikes crystal 23 of $Tl_3AsSe_3$ to which is affixed transducer 24 electrically connected to RF generator 25. Generating a sound wave in the crystal diffracts the laser output causing it to strike screen 26 instead of passing through aperture 27 in the screen.

ACOUSTIC DELAY LINE

An acoustic delay line causes an electrical signal to be delayed for the length of time required for an acoustic signal to traverse the crystal, L/V, where L is the length of the crystal and V is the acoustic velocity. Unlike many other methods of delaying an electrical signal, an acoustic delay line preserves the original configuration of the signal.

Figure 4:
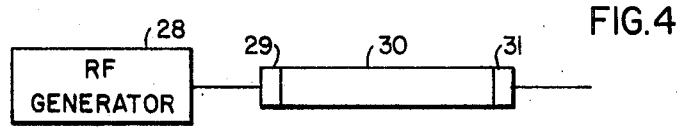
FIG. 4 is a diagrammatic drawing of an acoustic delay line.

In FIG. 4, RF generator 28 provides the electrical signal to be delayed. This signal is electrically transmitted to transducer 29 which converts the signal to an acoustic wave which is propagated through crystal 30 of $Tl_3AsSe_3$. At the other end of the crystal transducer 31 detects the acoustic wave and converts it into an electrical signal.

We claim:

1. In a method of acoustically diffracting light having a wavelength of about 1.25 to about $17\mu m$, the improvement which comprises passing said light through parallel optical faces of a crystal of $Tl_3AsSe_3$ while generating a sound wave in said crystal the wave fronts of which are at a diffracting angle to said light.

2. A method according to claim 1 wherein said angle is 0° and the frequency of said sound wave is less than about 50MHz.

3. A method according to claim 1 wherein said sound waves move parallel to said optical faces.

4. A method according to claim 1 wherein said sound waves are shear waves.

5. A method according to claim 1 wherein said light is parallel, polarized, and strikes a viewing screen after passing through said crystal.

6. A method according to claim 5 wherein the frequency of said sound waves is at least about 50MHz and the sin of said angle is $\lambda/\Lambda$ where $\lambda$ is the wavelength of said light and $\Lambda$ is the wavelength of said sound wave.

7. A method according to claim 5 wherein said viewing screen is a thermally-quenched, UV-excited phosphor screen.

8. A method according to claim 1 wherein said light is from a laser which comprises a lasing medium positioned between two opposing mirrors.

9. A method according to claim 8 wherein said crystal of $Tl_3AsSe_3$ is positioned between said lasing medium and one of said two opposing mirrors.

10. A method according to claim 8 wherein said crystal of $Tl_3AsSe_3$ is positioned external to said laser.

11. A method according to claim 1 wherein said crystal is greater than 1cm³ in volume and said optical faces are each at least about 10⁻³ cm wide.

12. In an acousto-optical system having
1. a light-diffracting medium having two parallel optical faces;
2. means for generating sound waves in said medium;
3. a source of light having a wavelength of about 1.25 to about 17 $\mu m$ directed at one of said optical faces at a diffracting angle to the wave fronts of said sound wave; and
4. means for detecting at least part of said light after it passes through said medium, the improvement which comprises a medium which consists of a crystal of $Tl_3AsSe_3$ having two parallel optical faces.

13. An acousto-optical system according to claim 12 wherein said sound waves are a shear waves.

14. An acousto-optical system according to claim 12 wherein said sound waves move parallel to said optical faces.

15. An acousto-optical system according to claim 12 wherein said diffracting angle is 0° and the frequency of said sound wave is less than about 50MHz.

16. An acousto-optical system according to claim 12 wherein said means for generating sound waves is a transducer affixed to said crystal and electrically connected to an RF generator.

17. An acousto-optical system according to claim 12 wherein said means for detecting said light is a viewing screen.

18. An acousto-optical system according to claim 17 wherein a second means generates a second sound wave normal to the first sound wave.

19. An acousto-optical system according to claim 18 wherein said second means is a transducer affixed to said crystal and electrically connected to an RF generator.

20. An acousto-optical system according to claim 17 wherein said light is unidirectional and polarized.

21. An acousto-optical system according to claim 17 wherein said viewing screen is a phosphor coated screen.

22. An acousto-optical system according to claim 17 wherein said viewing screen is a thermally-quenched UV-excited phosphor screen.

23. An acousto-optical system according to claim 17 wherein the frequency of said sound wave is at least about 50MHz and the sin of said diffracting angle is $\lambda/\Lambda$ where $\lambda$ is the wavelength of said light and $\Lambda$ is the wavelength of said sound wave.

24. An accousto-optical system according to claim 12 wherein the source of said light is a laser comprising a lasing medium and two opposing mirrors.

25. An acousto-optical system according to claim 24 wherein said crystal is positioned between said lasing medium and one of said mirrors.

26. An acousto-optical system according to claim 24 wherein said crystal is positioned external to aid laser.

27. An acousto-optical system according to claim 12 wherein said crystal is greater than 1cm³ in volume and said optical faces are each at least about 10⁻³ cm wide.

* * * * *